United States Patent [19]

Kimmelaar

[11] Patent Number: 4,490,054
[45] Date of Patent: Dec. 25, 1984

[54] MACHINE TOOL BEARING SYSTEM

[75] Inventor: Rudolf J. A. Kimmelaar, Vlaardingen, Netherlands

[73] Assignee: Cincinnati Milacron Inc., Cincinnati, Ohio

[21] Appl. No.: 477,360

[22] Filed: Mar. 21, 1983

[51] Int. Cl.³ ............................................. F16C 32/06
[52] U.S. Cl. .................................................. 384/117
[58] Field of Search ............... 384/117, 118, 311, 309, 384/399, 111

[56] References Cited

U.S. PATENT DOCUMENTS

| | | | |
|---|---|---|---|
| 2,936,197 | 5/1960 | Weiler | 384/117 |
| 3,110,527 | 11/1963 | Fox | 384/399 |
| 3,351,394 | 11/1967 | Hooker | 384/117 |
| 3,675,977 | 7/1972 | Arsenius et al. | 384/117 |

*Primary Examiner*—Lenard A. Footland
*Attorney, Agent, or Firm*—Thomas M. Farrell

[57] ABSTRACT

A machine tool bearing system is disclosed for grinding machines and the like, wherein a housing has a spindle bore in which is carried a plurality of bearing sets of the rocking shoe segment type. A spindle is rotatably journalled in the bearing sets, and a lower pressure operating fluid is supplied to wet the spindle bearing surfaces. A hydrostatic pressure area is defined on the lowermost of the rocking shoe segments, and fluid at a higher operating pressure is supplied through a check valve system to the hydrostatic pressure area to provide a lifting force to the spindle during start-up conditions. When the spindle reaches its operating rpm., a hydrodynamic pressure is generated in the shoe segments, and serves to provide a stiff support system to the spindle and also serves to shut off the flow from the check valve system.

3 Claims, 4 Drawing Figures

1

MACHINE TOOL BEARING SYSTEM

BACKGROUND OF THE INVENTION

In machine tool spindle support systems, it has been the practice to utilize antifriction type bearings such as roller and ball bearings for supporting a tool spindle in its housing. Some support systems require extreme accuracy and stiffness not found in roller type bearing elements, which can introduce cyclical irregularities into a support system. In grinding machines in particular, it has been found that the hydrostatic bearing system (that is, where high pressure pockets of oil are located at various peripheral points around a bearing diameter of a spindle), is utilized to provide high stiffness and good centrality of location. The hydrostatic bearing system tends to be self-restoring to the central state as a spindle is deflected. Several disadvantages are inherent in a hydrostatic bearing system, however, namely extremely close tolerances must be provided across the leakage land of the bearing to permit the escape of fluid and consequent pressure drop due to the leakage flow. Secondly, extremely high pressures, i.e. in the nature of 500 lbs. per square inch or more must be provided by a pump system to the hydrostatic pockets.

Spindle support system have attempted to utilize another hydraulic type of journal bearing: the hydrodynamic bearing. In the hydrodynamic bearing, a plurality of tilting pad shoes are employed around the pheriphery of a spindle bearing diameter, and low pressure oil is permitted to flood the shoe bearings and spindle diameter. When the spindle is rotated at the running rpm. (generally a high rpm., in the nature of 1000 rpm. or higher), the spindle exerts a frictional drag on the fluid bath and drives a wedge of oil into the clearance between the spindle and the tilting bearing pad. The advantage of the hydrodynamic bearing is that extremely high stiffness of a bearing system may be generated by the rotating spindle, but the stiffness at starting up speeds and slow down speeds is extremely low, since the pressure is low in the bearing clearance area. Consequently, during start up and slow down conditions, the spindle will actually rub on the lowermost shoe of a multishoe support system. In time, wear can occur on both the shoes and the spindle bearing diameters, thus greatly effecting spindle bearing performance and life.

The life of the spindle bearings is thus directly related to the number of start-ups and shut-downs of a spindle bearing system. Of course, the spindle start-up condition would exist at least once a day when starting a machine for a work shift, and as wheel changes are required, the spindle must be stopped as well.

Applicant has obviated the difficulties inherent in the prior art hydrodynamic bearing systems, by a novel bearing system which employs a hydrostatic bearing integral with the hydrodynamic system, and the hydrostatic bearing is automatically shut off as the hydrodynamic bearing is run at the operating condition.

SUMMARY OF THE INVENTION

The invention is shown embodied in a machine tool bearing system wherein a housing has a spindle bore and a bearing set of the rocking shoe type is located within the spindle bore. A tool spindle (for example, a grinding wheel support spindle) is rotatably journalled in the spindle bearing set and hydraulic fluid at a first operating pressure is supplied to the spindle bearing surfaces. A hydrostatic pressure are is defined on the lowermost of the locking shoe segments, and fluid at a second, higher operating pressure is supplied to the hydrostatic pressure area. A fluid control valve such as a ball check valve is utilized in the port supplying the higher pressure fluid to the hydrostatic pressure area. In operation, the spindle is rotated and supported by the hydrostatic pressure area, until such point as the spindle reaches an operating rpm., which generates a third, still higher operating pressure (generated hydrodynamically) in the bearing set. The third operating pressure serves to bias the fluid control valve to a closed position, thus deenergizing the hydrostatic pressure area.

DESCRIPTION OF THE PREFERRED EMBODIMENT

Figure 1:
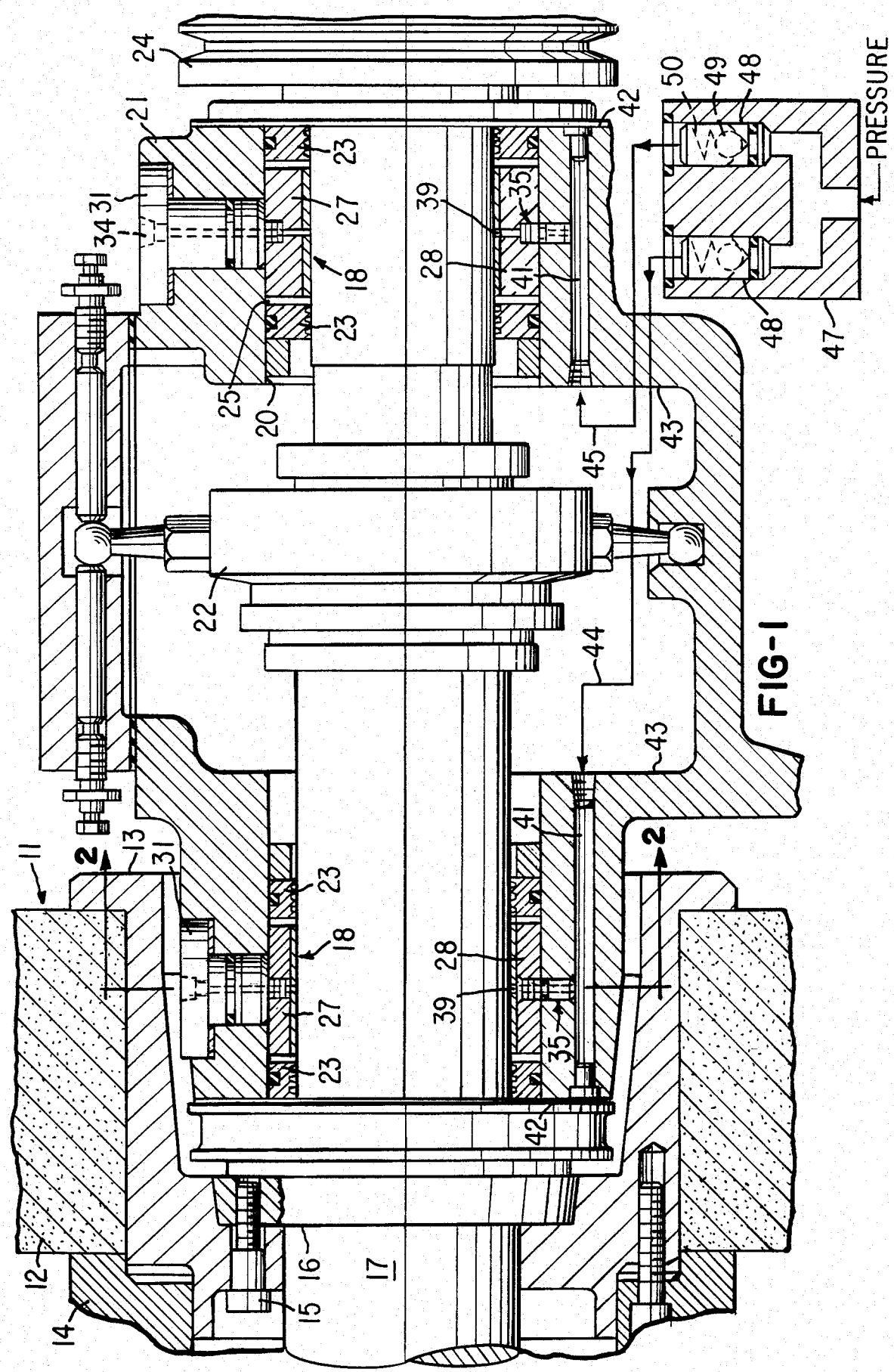
FIG. 1 is an elevational section through the grinding wheel spindle support housing of a centerless grinding machine.

FIG. 1 of the drawings depicts an elevational section through a wheelhead 10 of a grinding machine where a grinding wheel assembly 11 consisting of a grinding wheel 12, collet 13, and flange 14, are secured by screws 15 to a mounting surface 16 of a grinding wheel spindle 17. The grinding wheel spindle 17 is supported and rotatably journalled in an identical pair of shoe-type spindle bearing sets 18 which are carried in front and rear bores 19,20 in the wheelhead housing 21. The spindle 17 has an end thrust bearing assembly 22 at its midspan location between the bearing sets 18 to prevent axial movement of the spindle 17 during operation. A plurality of seals 23 are carried in the wheelhead bearing bores, 19,20, to contain a quantity of low pressure hydraulic oil at the bearing sets 18, and to prevent the entry of contaminents into the system. The rear end of the spindle 17 carries a drive sheave 24, which is belt driven by a wheelhead spindle drive motor (not shown).

The belt tension is directed in a generally downward direction because of the motor location at the bottom of the machine (not shown). It may be appreciated by those skilled in the art that since a belt drive system does not transmit pure torque into the driven member, substantial belt tension loads can exist in a high horsepower system, e.g., in the nature of 600 lbs. or more. The grinding wheel assembly 11 in a large grinding machine, such as a centerless grinder, can also weigh in the range of 500 lbs. or more. Thus, it can be seen that very large loads are impressed on the lower shoe of a bearing set 18 from the combination of: spindle weight; grinding wheel assembly weight; and belt tension loads.

Figure 2:
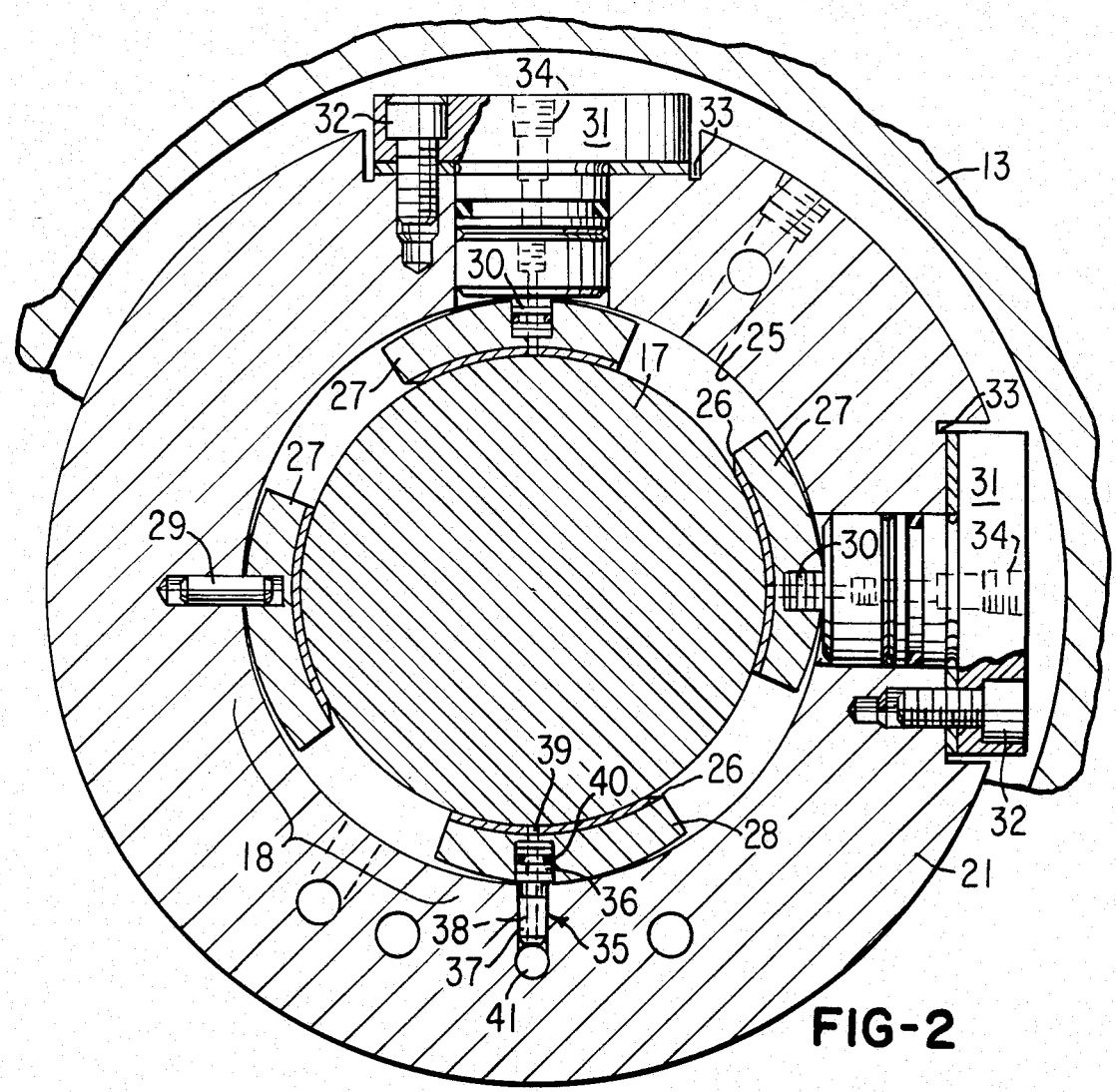
FIG. 2 is a section through the grinding wheel spindle taken along the line 2—2 of FIG. 1.

Referring to FIG. 2 in combination with FIG. 1, it can be seen that the bearing set 18 employed in the present system is a generally-conventional tilting pad, multi-shoe hydrodynamic bearing, wherein the bearing cavity 25 is filled with low pressure hydraulic oil prior to starting up the spindle 17, and, as the spindle 17 rotates it picks up a film of oil and drives it into the leading edge 26 of a pad, or shoe 27, generating high hydrodynamic pressure between the shoe and spindle surfaces, so that the spindle 17 will ride on a film of oil. The shoe 27 is rocked about a pivot pin, in order to find an equilibrium position about the spindle 17 as hydrodynamic pressure is generated.

It can be seen that the lower shoe 28 of a bearing set 18 can experience rubbing contact with the spindle 17 and subsequent wear as the spindle 17 is started up, and before the high pressure film is established. The start-up condition would generally exist at least once a day when starting a machine, but, in fact, can happen many times if the machine is shut down regularly. For example, as a wheel is chipped or damaged and must be replaced through various working shifts, the spindle must be stopped. Similarly, in some locations (particularly in Europe) when automatically loaded machines experience a part jamming situation, the grinding wheel is turned off while the machine is cleared of a jammed workpiece. This frequency of shut-down can occur ten or more times a day.

Referring to FIG. 2, it can be seen that the left shoe 27 is rockable about a fixed pivot pin 29 and the right and top shoes 27 are also pivotable about a fixed stud portion 30 of a wheelhead plug 31. The wheelhead plug 31 is secured by screws 32 in a radial bore 33 of the wheelhead housing 21, and is provided with a central tapped hole 34 through which pressure checks can be made by insertion of a threadable pressure gage (not shown). When the gage is not used, the tapped hole 34 is plugged. The lower shoe 28 of the bearing set 18 is pivotable on a special pivot pin 35 which is pressed into a radial bore of the wheelhead housing 21. The pivot pin 35 has a large pilot diameter 36 which is received in a bore of the shoe 28. The lower, smaller diameter 37 of the pin 35 is pressed into the bore of the housing. A central hole 38 extends through the length of the pivot pin 35, and a small diameter hole 39 is provided from the pilot bore through the shoe 28. An O-ring 40 is provided around the pilot diameter 36 to seal pressurized fluid which is provided through the central hole 38 and shoe 28. The lowermost end of the pivot pin 35 is in fluid communication with a hole 41 drilled through the wheelhead housing 21 parallel to the spindle 17.

Figure 3:
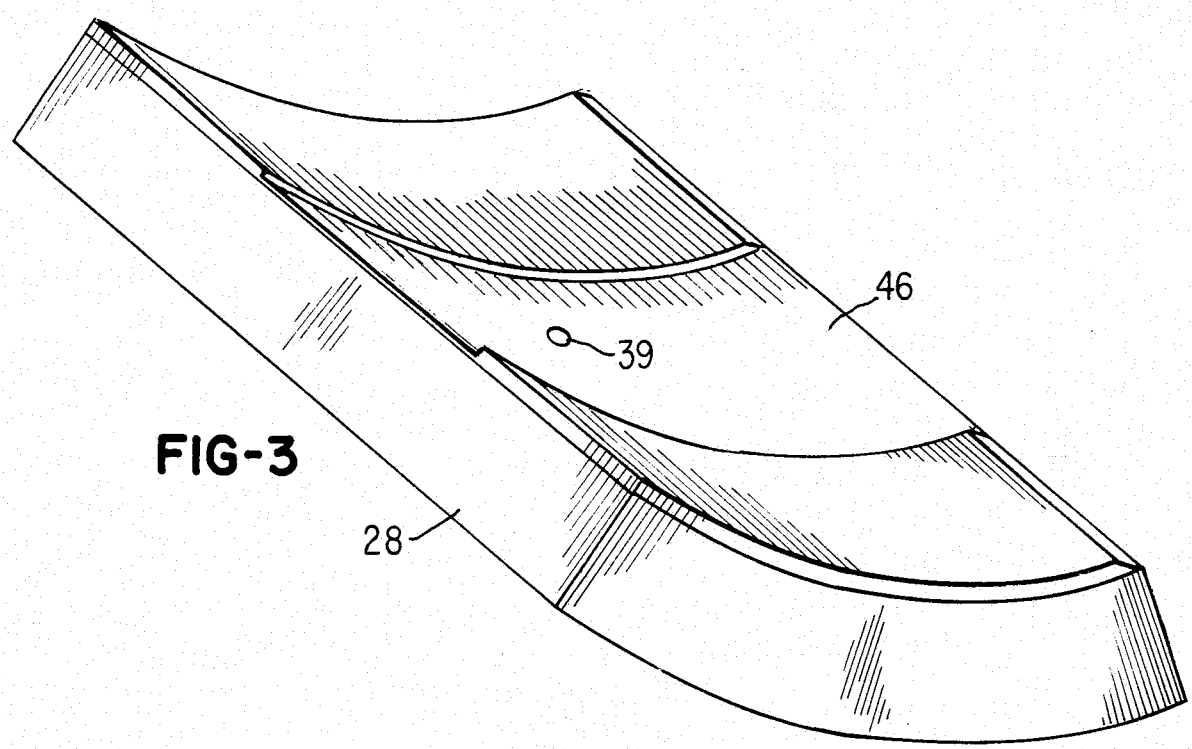
FIG. 3 is an isometric view of the lowermost support shoe of the spindle bearing set of FIG. 1.

FIG. 1 shows that the cross-drilled hole 41 is plugged at the outermost housing surface 42, and is threaded at an inner surface 43 of the wheelhead housing 21 to receive a hydraulic line 44. A second hydraulic line 45 is connected to the rear spindle bearing set 18 in a similar manner. The pivot pin 35 is located at an axial position midway along the shoe 28. The purpose of the drilled pivot pin 35 and hydraulic line 44 is to provide hydraulic pressure, immediately before spindle start up, to a relieved area 46 in the lower shoe 28—see FIG. 3. The relieved area 46 in the shoe 28 is in the nature of several thousandths deep, and has an axial width and circumferential length sufficient to create a surface area for hydrostatic lift which is to be multiplied by the hydraulic pressure supplied through the pivot pin 35. The hydraulic pressure employed is received from a pressure source such as a machine pump, having a low flow but high pressure, and the pressure is directed through a valve block 47 which feeds a pair of ball check valves 48. The ball check valves 48 are of conventional type, wherein flow from the pressure source overcomes a ball 49 and spring 50 to port fluid through the hydraulic line 44,45 to the bearing sets 18. The hydroostatic pressure employed is sufficient to relieve most of the total spindle load at start up time. The hydrostatic pressure does not lift the spindle 17 entirely free of the lower shoe surface, but it is contemplated that for certain designs one may wish to lift the spindle 17 entirely. The hydrostatic pressure is slightly below the maximum hydrodynamic pressure which is generated at the shoe-spindle interface. Thus, when the spindle 17 reaches maximum RPM and consequent maximum hydrodynamic pressure, the developed pressure will tend to overcome the supply pressure feeding the hydrostatic pocket and will, in combination with the spring force, force the ball 49 of the ball check valve 48 to a closed position, shutting off the supply hydrostatic pressure.

Figure 4:
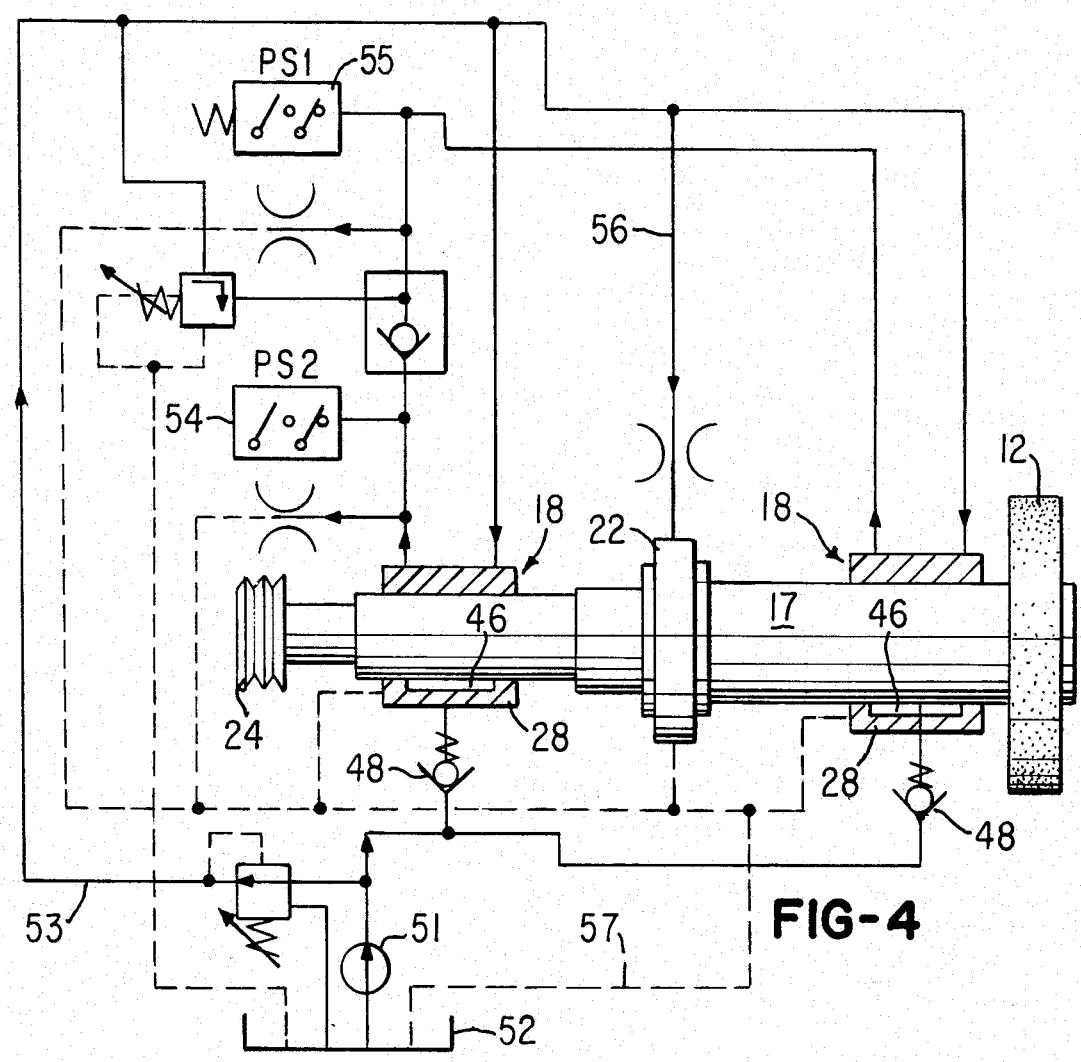
FIG. 4 is a hydraulic diagram of the spindle bearing support system of FIG. 1.

FIG. 4 depicts a hydraulic diagram for the bearing system shown. The grinding wheel spindle 17 is supported in a pair of bearing sets 18, and the lower shoe 28 of the set has a hydrostatic pocket or relieved area 46 machined therein. The hydraulic pump 51 supplies hydrostatic pressurized oil from the tank 52 to the ball check valves 48, to supply a load-relieving or lifting force to the spindle 17. The pump 52 also supplies low pressure along a hydraulic line 53 to feed filling oil into the general area of the bearing set 18, between the seals (not shown), see FIG. 1. The spindle 17 will not be permitted to start rotation until sufficient hydraulic oil exists in the bearing area—the presence of which is sensed by a pair of pressure switches 54,55. After the pressure switches 54,55 are activated, the spindle drive motor (not shown) may start rotation. Hydraulic pressure is also supplied along a line 56 to the spindle thrust bearing package 22. A series of drain lines are tied together at a common line 57 to drain the spindle bearing sets 18 and thrust bearing assembly 22. Thus, the advantages of a high performance hydrodynamic tilting pad spindle bearing are maintained while the start up problem and its attendant wear is obviated by the use of a hydrostatic bearing in the lowermost shoe 28. The hydrostatic supply pressure is automatically shut off by the spindle 17 at or near its maximum RPM. Similarly, at shut-down, the hydrostatic pressure will come back into operation to relieve much of the load of the spindle 17 during the slow down time.

The following example illustrates typical test machine parameters and the wear results:
Spindle weight: 131 Kg
Wheel mount (max.): 210 Kg
Belt tension: 250 Kg
Calculated reaction loads:
  (a) front shoe (nearest wheel mount)—183 Kg
  (b) rear shoe—456 Kg
Hydrostatic pressure: 250-300 psi
Hydrostatic relief:
  (a) front bottom shoe—10 MM wide, area of 2.4 SQ. CM, 0.05 MM deep,
  (b) rear bottom shoe—25 MM wide, area of 9.29 SQ. CM, 0.05 MM deep,
Hydrostatic force:
  (a) front shoe—130 Kg
  (b) rear shoe—432 Kg
Running speed: 45 M/sec. spindle surface speed (1410 RPM)
Hydrodynamic pressure in relief:
  500 psi @ 34 M/sec
  600 psi @ 45 M/sec
Breakaway torque:
  (a) without hydrostatic press.—10 KGM
  (b) with hydrostatic press.—4 KGM
Wear @ spindle/shoe interface:
  (a) without hydrostatic press.—12 micrometer wear after 250 starts/stops (b) with hydrostatic press.—2 micrometer wear after 1000 starts/stops The invention has been shown in connection with a pair of spindle bearing sets located between end loads of a grinding wheel spindle, but it is contemplated that the spindle drive point could be located between the bearings, as in a regulating wheel assembly of a centerless grinder, wherein a chain drive is typically employed between the bearings. Further, the bearing system may extend to opposite sides of a grinding wheel so that the grinding wheel is more rigidly supported than in a cantilever type system.

While the invention has been shown in connection with a specific embodiment, it is not intended to limit the invention to such embodiment, but rather the invention extends to all such designs and modifications as come within the scope of the appended claims.

What is claimed is:

1. A machine tool bearing system, comprising:
  (a) a housing, having at least one horizontal spindle bore;
  (b) at least one bearing set located in said bore, and having at least two rocking shoe segments, each having an arcuate spindle bearing surface, one segment disposed at the top of said bore and the other segment disposed at the bottom of said bore;
  (c) a spindle, rotatably journalled in said spindle bearing set;
  (d) means for supplying fluid at a first, relatively low operating pressure to said spindle bearing surfaces, substantially filling said bearing set with said fluid and immersing said bearing surfaces;
  (e) a hydrostatic pressure area defined on the spindle bearing surface of the bottom rocking shoe segment;
  (f) means for supplying fluid at a second, relatively high operating pressure from a pressure source along a supply line passing through said housing and bottom shoe segment into said hydrostatic pressure area;
  (g) means for hydrodynamically generating a third operating pressure on said bearing surfaces by spindle rotation, said third operating pressure being higher than said second operating pressure; and
  (h) means for discontinuing second pressure fluid flow into the hydrostatic pressure area in response to said third pressure when the third pressure exceeds the second pressure.

2. The machine tool bearing system of claim 1, wherein said means for discontinuing fluid flow comprises a fluid control valve, having line control elements interposed in said supply line supplying said fluid at said second operating pressure, said control elements biased to an open flow position by said second operating pressure, and biased to a closed flow position by said third operating pressure.

3. The machine tool bearing system of claim 2, wherein said fluid control valve is a unidirectional flow check valve.

* * * * *